May 26, 1936. H. R. ISLER 2,042,258
UNIVERSAL DIVIDING HEAD QUADRANT
Filed May 12, 1932 3 Sheets-Sheet 1

Inventor
HERMAN R. ISLER
By AH Parsons
Attorney

Inventor
HERMAN R. ISLER

May 26, 1936. H. R. ISLER 2,042,258
UNIVERSAL DIVIDING HEAD QUADRANT
Filed May 12, 1932 3 Sheets-Sheet 3

Inventor
HERMAN R. ISLER
By
AK Parsons
Attorney

Patented May 26, 1936

2,042,258

UNITED STATES PATENT OFFICE 2,042,258

UNIVERSAL DIVIDING HEAD QUADRANT

Herman R. Isler, Norwood, Ohio, assignor to The Cincinnati Milling Machine Company, Cincinnati, Ohio, a corporation of Ohio Application May 12, 1932, Serial No. 610,778

4 Claims. (Cl. 90—20)

This invention deals with drive mechanism for machine tools and contemplates an improved quadrant which may be applied to any size of milling machine for coupling the table drive member to any of the various sizes of attachments, such as dividing heads, spiral milling attachments, etc., that are adapted to be mounted on the table for power actuation thereby eliminating the necessity for carrying in stock a plurality of different size quadrants for a group of various size machines.

Another object of this invention is to provide a quadrant that is universally applicable to all sizes of milling machines for operatively coupling the table lead screw thereof to a table attachment, and that has a drive mechanism which is arranged in such a manner that the same change gears may be used for effecting a desired rate of rotation in the attachment per unit of table feed, irrespective of the pitch of the table lead screw, thereby eliminating the necessity of making corrections for different pitch lead screws when determining the change gears that will yield a given rate.

A further object of this invention is to provide an improved quadrant for milling machines embodying rate change and reverse mechanism which is completely inclosed at all times whereby the parts will be fully protected from foreign materials; and whereby injury to the operator from exposed moving parts will be eliminated.

An additional object of this invention is to provide mechanism of the class described which is simple in construction, inexpensive to manufacture and which may be easily and quickly attached or removed at the will of the operator.

Other objects and advantages of the present invention should be readily apparent by reference to the following specification, considered in conjunction with the accompanying drawings illustrative of one embodiment thereof, but it will be understood that any modifications may be made in the specific structural details within the scope of the appended claims, without departing from or exceeding the spirit of the invention.

Referring to the drawings in which like reference numerals indicate like or similar parts:

Since milling machines vary in size and power, it follows that the work table as well as the lead screw therefor will also vary in size and pitch, some machines having for instance a half-inch pitch lead screw and others a quarter-inch pitch lead screw. Also the distance between the axis of the lead screw and the supporting surface of the table will vary in accordance with the thickness of the table necessary to develop the proper strength for the particular machine. This variation in the pitch of the lead screw results in the table traveling different distances for one revolution of the screw.

Dividing heads and other attachments for milling machines will also vary with the size of the machine, powerful machines having large, heavy-built fixtures while lighter machines are provided with correspondingly lighter fixtures. This means that the center of the drive shaft of the various fixtures will vary in height above the supporting surface of the table.

Broadly, therefore, this invention proposes a detachable quadrant of universal application which may be mounted on the end of a milling machine table for coupling the lead screw thereof with any size of fixture ordinarily used with such machine for power operation thereof. This quadrant is provided with a change gear transmission, any combination of gears of which will produce a given rate of rotation in a driven member which will be the same irrespective of the pitch of the lead screw or the height of the attachment of the machine to which it is attached. This is accomplished by providing a compensator between the lead screw and the change gear transmission which is adjusted when the quadrant is attached to the machine to correct for any lead screw which varies in pitch from the standard upon which the change gear mechanism is based. It is not necessary to provide an additional compensator between the change speed transmission and the attachment for the reason that practically all commercial attachments now in use have the same ratio of gearing between the input shaft and its final driven member.

Figure 2:
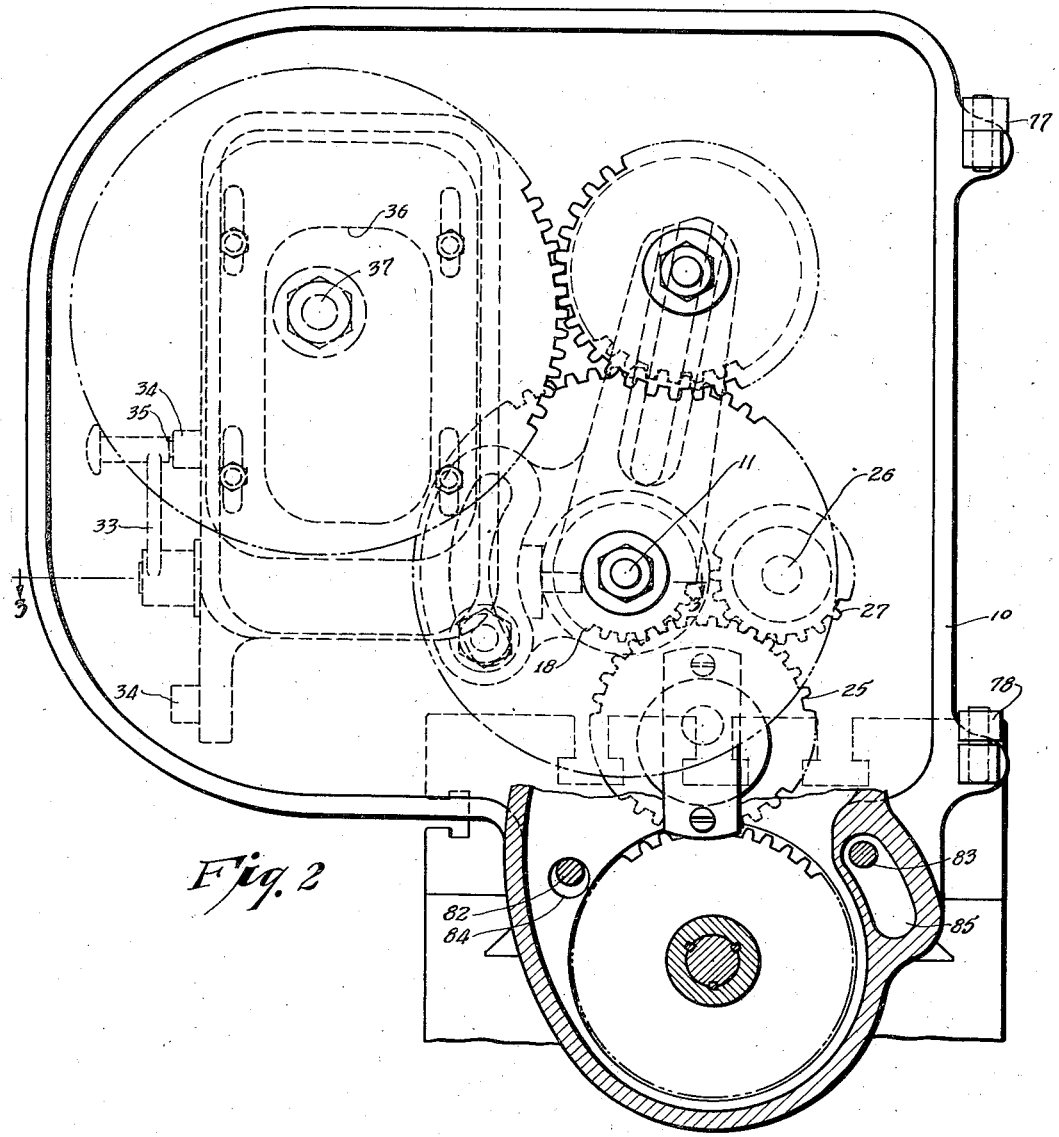
Figure 2 is a sectional view taken on the line 2—2 of Figure 1.
Figure 4:
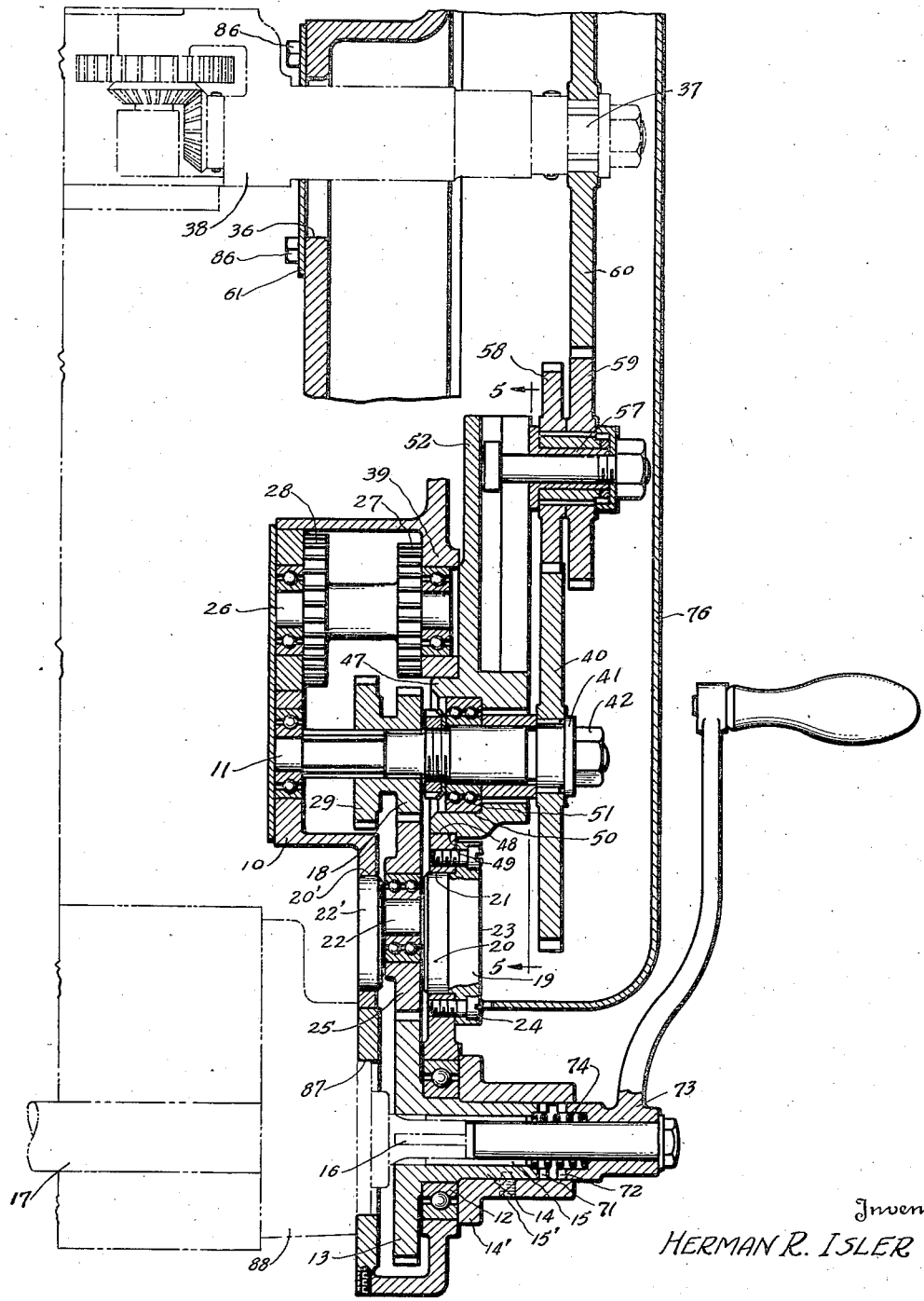
Figure 4 is an expanded view of the transmission mounted in the quadrant.

As shown in Figures 2 and 4, the quadrant comprises a main frame or quadrant plate 10 having anti-frictionally journaled therein a primary shaft 11. The lower part of the plate has secured therein a second anti-friction bearing 12 in which is journaled a gear 13, this gear having an elongated hub 14 projecting through the bearing to which a flange collar 14' is secured by a set screw 15'. The hub of this gear is provided with a splined bore 15 which is adapted to fit the splined end 16 of the lead screw 17 of the particular machine to which this device is attached. The size of the gear 13 will depend upon the pitch of the lead screw 17. As a basis for this determination, it has been assumed that the shaft 11 is to be rotated at the same rate as a one-quarter inch pitch lead screw, and therefore a quarter-inch lead screw would be connected to the primary shaft in a one-to-one ratio. For other pitches of lead screws the proper ratio of gearing is utilized to bring about this common result: For example, if the lead screw had a one-half inch pitch, then the gear 13 would be in a two-to-one ratio to the gear 18, as shown in Figure 4 of the drawings.

Since the diameter of the gear 13 will therefore vary, while the diameter of the gear 18 and its location on shaft 11 is fixed, it will be apparent that means must be provided intermediate these two gears for compensating for this variance in size of one gear in order to effect an operative connection between the two. For this reason an eccentric bearing carrier 19 is provided having a main circular portion 20 which is adapted to neatly fit in a circular bore 21 formed in the quadrant plate. An integral stud shaft 22 projects from the inner face of the plate, the center of which is eccentric with respect to the center of the circular body portion 20. An opening 20' is formed in the rear wall of the quadrant plate to permit access to the interior of the quadrant box and aid in assembly of the carrier. The carrier is provided with a diametrical rib 23 having screws 24 passing through opposite ends thereof for attaching the carrier to the frame. A plug 22' is forced into the opening 20' for closing the same and assists in holding the parts in position. The relation of the axis of the shaft 22 with respect to the axis of the carrier 20 is such that when the carrier is in the position shown in Figure 4 the gear 25 anti-frictionally mounted thereon will effect a power transmitting connection between the gear 13 and the gear 18 while if the carrier 20 is rotated 180°, the axis of the shaft 22 will be lowered to a position midway between the center of gear 13 and the center of shaft 11, so that a gear 13 of equal size to the gear 18 may be mounted in the bearing 12 and an intermediate idler mounted on the shaft 22 for coupling the gears 13 and 18 together. It will thus be seen that the carrier 20 is provided with two positions, one of which will effect connection between a half-inch pitch lead screw and the shaft 11, and the other position will effect connection between a quarter-inch pitch lead screw and the shaft 11, both of which will effect the same rotation in the shaft 11 for a given longitudinal movement of the table irrespective of the number of revolutions of the lead screw necessary to effect that longitudinal movement. From this it will be seen that the shaft could be provided with other positions to take care of other variations in sizes of lead screw although the two mentioned include practically all of the present standard machines upon the market.

A reversing mechanism has been provided for effecting rotation of the shaft 11 in either one of two directions. To this end an idler shaft 26 is journaled in anti-friction bearings carried by the frame parallel to the shaft 11. This idler shaft is arranged parallel to the shaft 11, and at the same radial distance from the center of the gear 25 as the shaft 11 is. Fixed to one end of the idler, is a gear 27 which is of the same size and pitch as the gear 18 so that upon rotation of the gear 25 both of these gears will be rotated simultaneously and in the same direction. A second gear 28 is secured to the other end of shaft 26, this gear being adapted to mesh with a shiftable gear 29 of equal size splined on the shaft 11 and formed integral with the gear 18. Movement of gear 29 to the left as viewed in Figure 4 will withdraw gear 18 from engagement with gear 25. Since the gears 18 and 27 are rotated in the same direction by the gear 25, it will be seen that withdrawing gear 18 out of driving engagement will cause the shaft 11 to rotate in the opposite direction upon the gear 29 meshing with gear 28.

Figure 1:
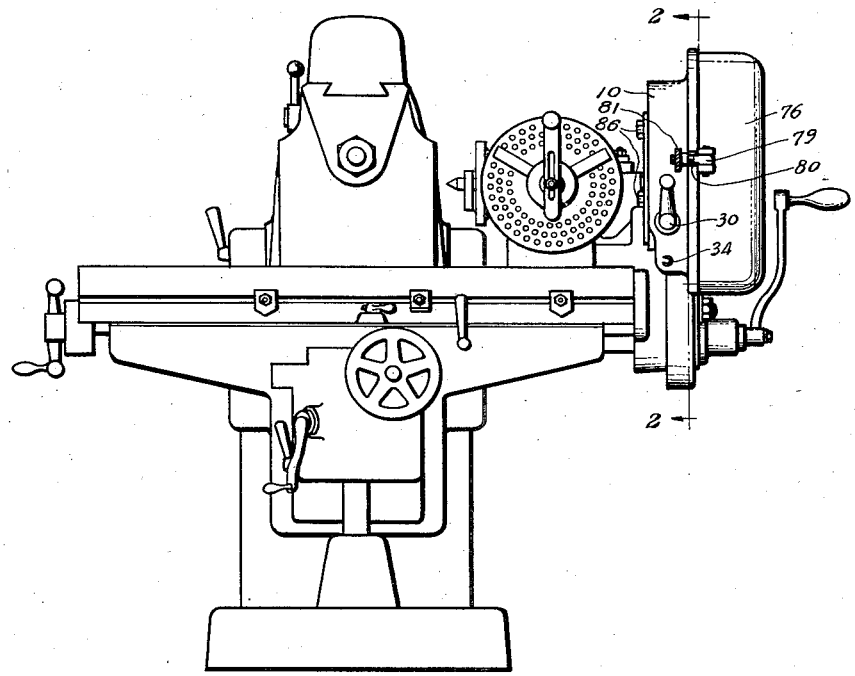
Figure 1 is an elevation of a machine tool showing the device of this invention attached thereto.
Figure 3:
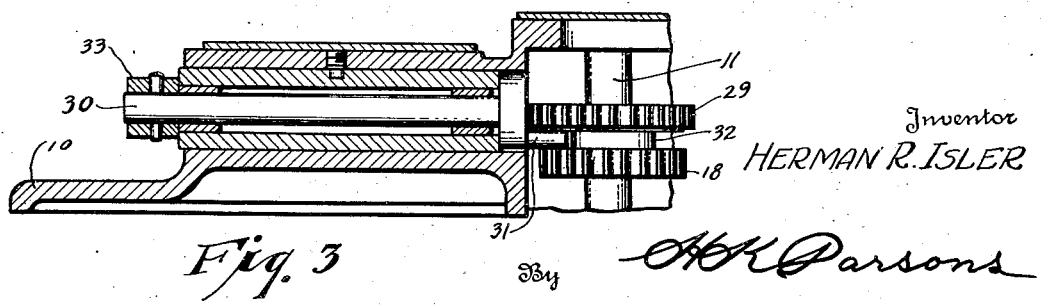
Figure 3 is a detailed section of the reversing mechanism as viewed on the line 3—3 of Figure 2.

The gear couplet 29—18 is adapted to be shifted by mechanism illustrated in Figure 3 comprising the rock shaft 30 which is journaled in the plate 10 at right angles to the shaft 11. The shaft 30 is provided on the interior end thereof with an eccentric pin 31 adapted to operatively engage the annular groove 32 formed in the couplet between the gears. The outer end of shaft 30 has a handle 33 pinned thereto for effecting rotation of the shaft; and since the axis of the shaft is midway between the two extreme positions of the couplet, it will be apparent that the shaft must be rotated through 180° to effect shifting of the couplet from one position to the other. In order to insure proper location of the parts and to guide the operator in making the reverse, the rear of the frame 10 is provided with a pair of bosses 34 arranged diametrically on opposite sides of the shaft 30 for receiving the locking pin 35 fixed in the end of the handle 33. It will be noted from Figure 1 that the reversing lever 33 is located on the front side of the attachment, thereby rendering it easily accessible to the operator.

The frame 10 is provided with a large opening 36 in the upper part thereof for receiving therein the gear shaft bracket which is integral with the particular spiral milling head, dividing head or other attachment mounted on the table. The size of this opening is considerably enlarged because of the wide variation in sizes and types of attachments, it being necessary to provide for some 15 or 20 different locations which the axis of this shaft might take. This bracket carries the input drive shaft of the attachment and the opening permits this bracket to project inside the quadrant so that the end of the drive shaft is substantially in the plane of change gear mechanism carried by the frame 10. In order to provide for variations in the rate of rotation of the attachment with respect to the travel of the table, a change gear mechanism has been interposed between the shaft 11 and the shaft 37 of the drive bracket 38.

To this end the shaft 11 has been projected through the supporting wall 39 for receiving on its other end a change gear 40 which is keyed thereon and held in position by a washer 41 and nut 42.

Figure 5:
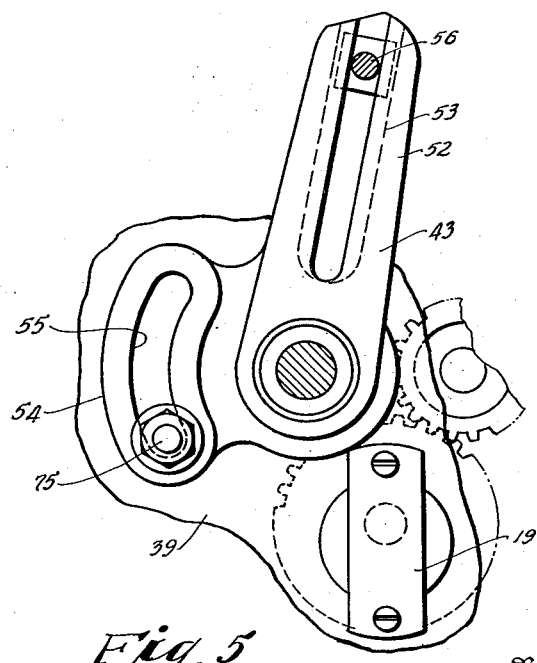
Figure 5 is a detailed view of the sweep arm.

A sweep arm 43, shown more particularly in Figure 5, is provided with a laterally projecting boss 47 which has an annular finished surface 48 fitting a bore 49 formed on the wall 39 forming a pivot about which the arm may be rotated. The boss 47 is counter-bored at 50 to receive the anti-friction bearing 51 in which one end of the shaft 11 is journaled for rotation. As shown in Figure 5, the sweep arm is in the form of a bell crank having one arm 52, in which is formed a longitudinal T-slot 53, and a second arm 54 in which is formed on arcuate slot 55.

A T-bolt 56 is mounted in the slot 53 for carrying a bushing 57 upon which is mounted a pair of change gears 58 and 59, one gear 58 of which is adapted to mesh with the gear 40 and the other gear 59 adapted to mesh with a gear 60 secured to the attachment drive shaft 37. Since the axis of the shaft 37 will vary in radial distance from the axis of the shaft 11 due to the variations in sizes of the various attachments and also since the size of the change gears will vary for different rates, it is necessary that the arm be pivotally mounted so that it may be swung through an arc to effect engagement of the particular gears being utilized. A clamping bolt 75 is therefore threaded in the wall 39 passing through the arcuate slot 55 for clamping the sweep arm in any one of its various positions.

Figure 6:
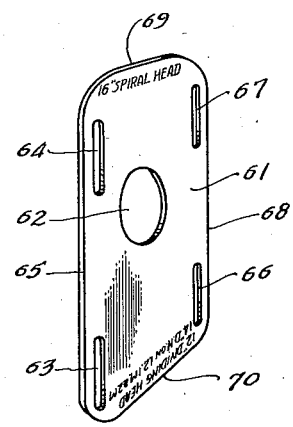
Figure 6 is a detailed view of the adapter plate.

As previously mentioned, the quadrant plate 10 is provided with a large opening 36 to receive the drive shaft bracket 38 of the particular attachment, and since this opening is on the side of the device adjacent the cutting, chips or other foreign material may accidentally pass through this opening and clog the gears. It is therefore proposed to use an adapter or closure plate 61, shown in detail in Figure 6, the plate having a hole 62 formed therein which is of sufficient size to neatly fit the shank of the drive shaft bracket of the various attachments. Also formed in this plate is a pair of longitudinally aligned slots 63 and 64 formed adjacent one edge 65 of the plate, and a second pair of longitudinally aligned slots 66 and 67 formed adjacent the opposite edge 68 of the plate, the slots 63 and 64 being closer on a horizontal line to the center of the hole 62 than the slots 67 and 66. On the other hand, the hole 62 is closer along a vertical line to the upper edge 69 of the plate than to the lower edge 70.

Due to this eccentric location of the hole 62 with respect to the center of the plate 61, it may assume four different positions. That is, beside the position shown in Figure 6, the plate may also be turned around while lying in the same plane to a second position while if the plate 70 is reversed it may be given two additional positions. The vertical slots, above referred to, permit vertical adjustment of the plate while in any one of these four positions. This cover plate may be suitably marked across the top and bottom of each face to indicate to the operator the position of the plate relative to the size of attachment being used.

The table and its attachment may be manually rotated as well as power actuated and therefore the hub of gear 13 has been extended and provided with clutch teeth 71 adapted to be engaged by clutch teeth 72 formed on the inner end of the axially shiftable handle 73. A spring 74 is interposed between the parts to normally maintain the handle out of operative engagement with the gear 13 and thereby prevent the operator from being injured thereby.

A cover plate 76 is hinged at 77 and 78 to the plate 10 to completely enclose the change gear mechanism while permitting ready access thereto. A locking bolt 79 is pivotally attached to the cover plate 76 for swinging through a slot 80 formed in the edge of plate 10, the end of the bolt being threaded to receive the lock nut 81. By this means the cover plate may be easily and quickly opened to effect changes in the gears.

In attaching the device to a given machine, selection is first made by means of the marking on the plate of the proper side to face outward from the quadrant in accordance with the attachment to be associated therewith and the plate then slid into the drive shaft bracket of the particular attachment. The quadrant is positioned to receive the splined end 16 of the lead screw in the bore of gear 13 and also centered and supported on the boss 87 formed in the back apron 88. After positioning the quadrant on the end of the table, bolts 82 and 83 are passed through apertures 84 and 85 and threaded into existing threaded holes in the back apron of the table. These holes are in slightly different locations in different machines and therefore the apertures 84 and 85 are enlarged to cover all conditions. After securing the quadrant in place at the end of the table, the plate 61 is rotatably positioned to align the slots therein with the threaded holes in the plate and bolts 86 threaded in the holes to hold the plate in position.

There has thus been provided a quadrant having universal application to all sizes of milling machines for coupling the lead screw thereof with a table attachment for power actuation; the quadrant containing compensating means whereby one revolution of the attachment drive will be effected for a predetermined travel of the table irrespective of the pitch of the table lead screw. It will be noted that due to this arrangement the change gears necessary to yield a given speed will be the same irrespective of the machine to which it is attached. It will also be noted that the mechanism is completely enclosed and protected and that a reverse control lever is mounted on the exterior of the housing which adds to the efficiency of the device.

That which is claimed is:

1. In a quadrant for power coupling the rotatable driver of a spiral milling attachment carried by a milling machine table to the actuating screw for the table, the combination of mechanism for imparting one revolution to the attachment during a predetermined travel of the table by its actuating screw irrespective of the pitch thereof, comprising a drive shaft, a rate changer and an attachment serially connected in the order recited, one revolution of said drive shaft corresponding to the travel imparted by one revolution of a lead screw having a predetermined pitch, a compensator for coupling different pitched lead screws to the shaft in ratios inverse to the ratio of the standard pitched lead screw to the other lead screws, said compensator comprising a rotatable plate, an eccentric stud shaft carried by the plate, means to angularly position the plate to vary the location of said stud shaft, different ratio gears applicable to the stud shaft for coupling any pitch of lead screw to the drive shaft to yield a common rate of travel in the table for each revolution of the attachment, a reverser interposed between the compensator and drive shaft for determining the direction of rotation of the attachment, said reverser comprising an auxiliary shaft having spaced gears fixed thereto, one of which is constantly coupled with the compensator, a slidable gear couplet, means to shift selectively one gear of said couplet into operative engagement with the compensator for effecting one direction of rotation of the attachment, or the other gear of the couplet into engagement with the remaining fixed gear to effect rotation of the attachment in the opposite direction.

2. In a universal milling machine quadrant, the combination of means for coupling table lead screws of different pitch to a spiral milling attachment for imparting one revolution thereto during a simultaneous predetermined linear table travel producible by a lead screw of given pitch, comprising a drive shaft, a rate changer, and an attachment operatively connected in the order recited, a first gear mounted on the drive shaft, a second gear of equal size to the first gear detachably connectible to said lead screw of given pitch for coupling the parts in a one to one ratio, additional gears for coupling lead screws of other pitches to the drive shaft, said other gears having a ratio to the first gear equal to the inverse ratio of the pitch of their respective lead screws to the pitch of the given lead screw, said drive shaft being spaced a fixed distance relative to the lead screw, and an idler gear interposed between said first gear and the lead screw gear, a rotatable plate carried by the quadrant, an eccentric stud shaft carried by the plate for supporting said interposed gears, means to angularly position said plate to vary the position of said interposed gear in accordance with the size of the lead screw gear, and additional means for reversing the rotation of said drive shaft relative to the direction of rotation of the lead screw.

3. In a universal quadrant for coupling different size attachments to a table lead screw of milling machines, said quadrant having a final drive shaft, the combination of a housing for inclosing said drive shaft, said housing having an enlarged aperture for receiving attachment drive shafts located at different heights above the table, a closure plate for said aperture having a hole therein eccentric to both the horizontal and vertical axes of the plate for receiving the attachment drive shaft, said plate being rotatable about either axis to vary the location of said hole, and means to connect the plate to said housing to close said aperture, said connecting means being adjustable whereby movement of the plate in a direction parallel to one of said axes may be made to further vary the location of said hole.

4. A universal quadrant for coupling table lead screws of different pitch to different spiral milling attachments carried by the table of a milling machine for actuation thereby comprising means for detachably securing the plate to said table, transmission gearing carried by the plate for operatively coupling the lead screw to the attachment driver, a housing enclosing said gearing, said plate having an enlarged aperture for receiving the attachment bracket which carries the attachment drive shaft and which is insertable in said aperture for positioning said drive shaft in operative relation to said gearing, a closure plate for said aperture having an opening therein through which said bracket is adapted to pass, said opening in the plate being eccentrically positioned with respect to the longitudinal and lateral axes thereof whereby the plate may be rotatably positioned to close said aperture regardless of the position of said bracket with respect to the central axis of said aperture, and means to secure the closure plate to said housing.

HERMAN R. ISLER.